(12) United States Patent
Anderson

(10) Patent No.: US 6,472,480 B1
(45) Date of Patent: Oct. 29, 2002

(54) COATING COMPOSITION

(75) Inventor: Ronald Leslie Anderson, Naperville, IL (US)

(73) Assignee: BP Corporation North America Inc., Chicago, IL (US)

( * ) Notice: Subject to any disclaimer, the term of this patent is extended or adjusted under 35 U.S.C. 154(b) by 59 days.

(21) Appl. No.: 09/789,148

(22) Filed: Feb. 20, 2001

(51) Int. Cl.$^7$ .......................... C08F 20/00; B32B 15/08
(52) U.S. Cl. ...................... 525/437; 428/457; 428/458; 428/480; 428/482; 428/35.8; 528/272; 528/302; 528/363
(58) Field of Search .................................. 428/457, 458, 428/480, 482, 35.8; 525/437, 441; 528/272, 289, 302, 332, 363

(56) References Cited

U.S. PATENT DOCUMENTS 5,380,816 A * 1/1995 Sullivan ................... 427/372.2

* cited by examiner

Primary Examiner—James J. Seidleck
Assistant Examiner—Travis B. Ribar
(74) Attorney, Agent, or Firm—Mary Jo Kanady; James R. Henes

(57) ABSTRACT

A coating composition is disclosed that is intended for application to the interior surface of a can and is free of Bisphenol A diglycidyl ether and comprises a phenoxy group-containing or amino group-containing resin, a non-aqueous carrier and a polyester resin formed from (a) isophthalic acid, (b) naphthalene dicarboxylic acid or an ester thereof, (c) trimellitic anhydride or trimethylpropane and (d) neopentyl glycol.

17 Claims, No Drawings

COATING COMPOSITION

BACKGROUND OF THE INVENTION

Field of the Invention

This invention relates generally to a coating composition and more particularly concerns a coating composition for the interior surface of a can.

It is well known that an aqueous solution in contact with an untreated metal substrate can result in corrosion of the untreated metal substrate. Therefore, a metal article, such as a metal closure or container for a water-based product, like a food or beverage, is rendered corrosion resistant in order to retard or eliminate interactions between the water-based product and the metal article. Generally, corrosion resistance can be imparted to the metal article, or to a metal substrate in general by coating the metal substrate with a corrosion-inhibiting coating.

Coating compositions for the inside of beer, beverage and food cans must be approved for direct food contact. The fundamental function of the inside coatings on cans and ends is to protect the packed product to maintain its nutritional value, texture, color and flavor when purchased and used by the consumer. To meet these requirements, the organic film must be free of any material which might extract into the packed product and must maintain its integrity over the product recommended shelf life. The ingredients in the can must not make contact with the metal surface. On the whole, current commercial coating compositions for cans and ends, have met all these performance criteria. The precoated metal sheets are subjected to severe elongative and compressive stresses during the can forming process of the fabrication of can ends. The integrity of the respective coating must be maintained during all the specific fabrication operations. The easy open ends, for two-piece beverage cans for example, are stamped from precoated aluminum coil and are fed through a series of presses where the rivet, scaring and tab making steps occur. Coatings for ends must be highly flexible to withstand this series of operations.

Investigators continually have sought improved coating compositions that reduce or eliminate corrosion of a metal article and that do not adversely affect an aqueous product packaged in the metal article. However, improving one particular advantageous property is often achieved at the expense of another advantageous property. Investigators have sought coatings that possess chemical resistance in addition to corrosion inhibition. A useful coating for the interior of a metal closure or container must be able to withstand the solvating properties of the packaged product. If the coating does not possess sufficient chemical resistance, components of the coating can be extracted into the packaged product and adversely affect the product. Even small amounts of extracted coating components can adversely affect sensitive products by imparting an off-taste to the product.

Epoxy resins are widely used in coating compositions for application to the interior surfaces of food cans. Bisphenol A diglycidyl ether (Badge) is widely used as a monomer for epoxy resins. When epoxy resins made from bisphenol A diglycidyl ether are employed in coating compositions that are used on the interior surfaces of food cans, residual bisphenol A diglycidyl ether can be extracted into the food, and for this reason, epoxy resins containing bisphenol A diglycidyl ether and used for this application have come under scrutiny by various regulatory agencies. Thus, it is highly desirable to develop a polyester resin that can be cross-linked by a hardener to provide an alternative to the currently employed combination of an epoxy resin and a crosslinking hardener.

Polyester resins possess many of the essential properties such as flexibility, adhesion to metal and corrosion resistance, that are needed in a resin that is employed in a can coating for the interior surface of a can, and additionally are free of bisphenol A diglycidyl ether. When cross-linked with suitable hardeners such as a phenoxy group-containing or amino group-containing resin, polyester resins can form excellent coatings. However, the critical shortcoming of conventional polyester resins for use in coatings of the interior surfaces of cans is that their ester bonds are susceptible to hydrolysis, especially during the retort process after the food is canned.

Japanese laid open patent application (Kokai) No. 4-39370 which was laid open on Feb. 10, 1992 discloses a resin composition for can coating materials characterized in that a polyester resin (A) and an alkyl etherified amino formaldehyde resin (B) are compounded in a proportion of (A)/(B)=95-60/5-40 (weight ratio) in which the dicarboxylic acid component is 20 to 80 mol % of isophthalic acid, 80 to 20 mol % of aromatic dicarboxylic acid such as naphthalene dicarboxylic acid other than isophthalic acid, 0 to 50 mol % of aliphatic dicarboxylic acid of 2 to 12 carbon atoms, the glycol component is 25 to 99 mol % of glycol containing at least one or two or more side chain alkyl groups as indicated by general formula (I) below, 1 to 75 mol % of glycol with 8 to 12 carbon atoms and 0 to 50 mol % of other alkyl glycols, and, in which, further, polycarboxylic acids and/or polyols that are trivalent or of higher valence are present in an amount of 0.5 to 10 mol % relative to the total acid component.

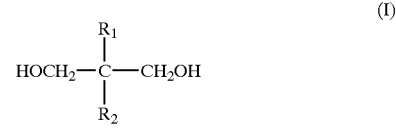

(I)

wherein, $R_1$ and $R_2$ are alkyl groups with 1 to 6 carbon atoms. However, the resin composition is disclosed as being applicable as a coating for the exterior surface of a can.

OBJECTS OF THE INVENTION

It is therefore a general object of the present invention to provide an improved coating composition for the interior surface of a can which solves the aforementioned problem and meets the aforementioned need.

More particularly, it is an object of the present invention to provide an improved coating composition for the interior surfaces of a can which employs a polyester resin cross-linked with a phenoxy group-containing or amino group-containing resin that is stable to hydrolysis or sterilization.

Other objects and advantages of the invention will become apparent upon reading the following detailed description and appended claims.

SUMMARY OF THE INVENTION

The aforesaid objects are achieved by the coating composition of the present invention for application to an interior surface of a can, comprising a phenoxy group-containing or amino group-containing resin cross-linking agent in an amount in the range of from about 2 to about 45 weight percent of the coating composition, a polyester resin in an amount in the range of from about 6 to about 59 weight percent of the coating composition, and a nonaqueous carrier in the range of from about 35 to about 80 weight percent of the coating composition, wherein the polyester resin comprises a condensation product formed from (a) from about 2 to about 48 mole percent of isophthalic acid, (b) from about 2 to about 48 mole percent of a naphthalene dicarboxylic acid or alkyl ester thereof, (c) from about 0 to about 10 mole percent of trimellitic anhydride or trimethylolpropane, and (d) from about 30 to about 60 mole percent of neopentyl glycol.

DETAILED DESCRIPTION OF THE PREFERRED EMBODIMENTS

A coating composition of the present invention, after curing, provides a cured coating composition that effectively enhances corrosion inhibition of metal substrates, such as, but not limited to, aluminum, iron, steel and copper. The present coating composition, after curing, also demonstrates excellent adhesion to the metal substrate, excellent chemical resistance and scratch resistance, excellent flexibility, and excellent stability to hydrolysis and sterilization.

In general, the coating composition of the present invention for application to an interior surface of a can comprises a phenoxy group-containing or amino group-containing resin that serves as a cross-linking agent in an amount in the range of from about 2, preferably from about 4, more preferably from about 8, to about 45, preferably to about 40, more preferably to about 33 weight percent of the coating composition, a polyester resin of this invention in an amount in the range of from about 6, preferably from about 8, more preferably from about 10 to about 59, preferably to about 52, more preferably to about 39 weight percent of the coating composition, and a nonaqueous carrier in the range of from about 35 to about 80 weight percent of the coating composition.

A polyester resin of this invention comprises a condensation product formed from (a) from about 2, preferably from about 10, more preferably from about 25, to about 48, preferably to about 40, more preferably to about 38, mole percent of isophthalic acid, (b) from about 2, preferably from about 4, more preferably from about 8, to about 48, preferably to about 20, more preferably to about 15, mole percent of a naphthalene dicarboxylic acid or alkyl ester thereof, (c) from about 0, preferably from about 2, more preferably from about 4, to about 10, preferably to about 8, more preferably to about 7 mole percent of trimellitic anhydride or trimethylolpropane, and (d) from about 30, preferably from about 42, more preferably from about 44, to about 70, preferably to about 60, more preferably to about 56, mole percent of neopentyl glycol. The polyester resin of the present invention is free of bisphenol A diglycidyl ether.

The polyester has a molecular weight of about 1,000 to about 50,000, and preferably about 1,000 to about 10,000. To achieve the full advantage of the present invention, the polyester has a molecular weight of about 1,500 to about 6,000. The polyester is prepared by methods well known in the art. The esterification reaction is preferably carried out in a nitrogen atmosphere at temperatures of between 180° C. and 260° C. Catalysts such as dibutyltin oxide, tin-chloride or tetrabutoxy titanate, and antioxidants such as triphenyl phosphite may be used as additives. The reaction water released during the reaction is removed by distillation. The desired degree of esterification is reached by means of azeotropic distillation or vacuum in the last phase. The reaction results in a polyester that can subsequently be dissolved or emulsified in water, an organic solvent or a mixture of solvents. Suitable solvents include aromatic hydrocarbons such as, for example, Solvesso 150™ (Esso), esters of glycol ethers, such as, for example, methoxypropyl acetate (Dowanol PMA) or glycol ethers, such as, for example ethylene glycol monobutyl ether (Dowanol EB). The solids content of the polyester can, for example, range between 45 and 80% and is preferably between 50 and 65%.

The polyester has to be crosslinked with a hardener or crosslinker such as, for example, an amino group containing resin, a phenoxy group containing resin, or a phenolic resin. The weight ratio polyester:hardener resin is generally between 95:5 and 60:40 (based on solid resin). A suitable catalyst for the curing reaction includes, for example, dodecyl benzene sulphonic acid, phosphoric acid, or partial esters of phosphoric acid.

The present coating composition is a nonaqueous composition, wherein the cross-linking agent resin and the polyester are homogeneously dispersed in a nonaqueous carrier. In general, the nonaqueous carrier has sufficient volatility to evaporate essentially entirely from the coating composition during the curing process, such as during heating at about 170° C. to about 225° C. for about 8 to about 20 minutes. Suitable nonaqueous carriers are known in the art of coating compositions, and include for example, but are not limited to, glycol ethers, like ethylene glycol monomethyl ether, ethylene glycol monoethyl ether, ethylene glycol monobutyl ether, and propylene glycol monomethyl ether; ketones, like cyclohexanone, ethyl aryl ketones, methyl aryl ketones and methyl isoamyl ketone; aromatic hydrocarbons, like toluene, benzene and xylene; aliphatic hydrocarbons, like mineral spirits, kerosene and high flash VM&P naphtha; alcohols, like isopropyl alcohol, n-butyl alcohol and ethyl alcohol; and aprotic solvents, like tetrahydrofuran; chlorinated solvents; esters; glycol ether esters, like propylene glycol monomethyl ether acetate; and combinations thereof.

The nonaqueous carrier usually is included in the composition in a sufficient amount to provide a composition including from about 20% too about 50%, by weight of the composition, of the total weight of the polyester component. The amount of nonaqueous carrier included in the composition is limited only by the desired, or necessary, rheological properties of the composition. Usually, a sufficient amount of nonaqueous carrier is included in the coating composition to provide a composition that can be processed easily and that can be applied to a metal substrate easily and uniformly, and that is sufficiently removed from the coating composition during curing within the desired cure time.

Therefore, essentially any nonaqueous carrier is useful in the present coating composition as long as the nonaqueous carrier adequately disperses and/or solubilizes the composition components; is inert with respect to interacting with composition components; does not adversely affect the stability of the coating composition or the ability of the corrosion-inhibiting coating to inhibit corrosion of a metal substrate; and evaporates quickly, essentially entirely and relatively rapidly to provide a cured coating composition that inhibits the corrosion of a metal substrate, demonstrates good adhesion and flexibility, and has good chemical and physical properties.

A coating composition of the present invention also can include other optional ingredients that do not adversely affect the coating composition or a cured coating composition resulting therefrom. Such optional ingredients are known in the art, and are included in a coating composition to enhance composition esthetics; to facilitate manufacturing, processing, handling and application of the composition; and to further improve a particular functional property of a coating composition or a cured coating composition resulting therefrom.

Such optional ingredients include, for example, catalysts, dyes, pigments, extenders, fillers, lubricants, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but is included in a sufficient amount so as not to adversely affect a coating composition or a cured coating composition resulting therefrom.

One useful optional ingredient is a lubricant, like lanolin, which facilitates manufacture of metal closures by imparting lubricity to sheets of coated metal substrate. A lubricant is present in the coating composition in an amount of 0% to about 2%, and preferably about 0.1% to about 2%, by weight of nonvolatile material. Another useful optional ingredient is a pigment, like titanium dioxide. A pigment is present in the coating composition in an amount of 0% to about 50%, and preferably about 10% to about 50%, by weight of nonvolatile material. In accordance with an important feature of the present invention, the present coating composition is free of a bisphenol A diglycidyl ether component.

A coating composition of the present invention is prepared by simply admixing the cross-linking agent resin, the polyester and any optional ingredients, in any desired order, in the nonaqueous carrier, with sufficient agitation. The resulting mixture is admixed until all the composition ingredients are homogeneously dispersed throughout the nonaqueous carrier. Then, an additional amount of the nonaqueous carrier can be added to the coating composition to adjust the amount of nonvolatile material in the coating composition to a predetermined level.

The present invention will be more clearly understood from the following specific examples.

EXAMPLE 1

Five polyester resins were prepared and screened for solubility in three solvents commonly used in can coating applications. The materials and relative amounts thereof employed to prepare these polyester resins and the properties of the resulting resins are shown in Table 1. Resin A, in which the only diacid used in its preparation was isophthalic acid, was insoluble in all three solvents. The resins which were prepared with mixtures of isophthalic acid and terephthalic acid or dimethyl 2,6-naphthalenedicarboxylate were soluble in 2 of the 3 solvents and the resin which also contained trimellitic anhydride as the branching agent was soluble in all three of the solvents.

The following procedure was used to prepare the resins: All raw materials and catalyst were charged to a resin kettle equipped with an agitator, nitrogen sparge tube, thermocouple connected to a controller and heating mantle, and an overhead system designed to remove water and methanol but return higher boiling volatile components to the kettle. The catalyst used was hydrated monobutyl tin oxide (food grade FASCAT 4100) at 0.05% by weight of the total reaction mass. The lower melting components were charged to the bottom of the kettle to aid mixing when they melted. The nitrogen sparge was turned on and heat was applied to the kettle. When melting began, the agitator was turned on. The temperature of the reaction mass was raised to 225–230° C. and maintained at that temperature until the target acid number was reached. The reaction mass was then cooled to 170° C. and poured into a thin aluminum tray. After the resin cooled to room temperature, the aluminum tray was peeled away from the solid resin and the resin was broken into pieces for storage and use.

TABLE 1

| Resin | A | B | R1 | R2 | R3 |
|---|---|---|---|---|---|
| Monomers (moles) | | | | | |
| Isophthalic acid | 4.0 | 2.98 | 1.30 | 2.98 | 2.76 |
| Terephthalic acid | 0 | 0.86 | 1.30 | 0 | 0 |
| Dimethyl 2,6-NDC[1] | 0 | 0 | 1.20 | 0.86 | 0.80 |
| Neopentyl glycol | 3.83 | 3.69 | 3.60 | 3.69 | 4.96 |
| Trimethylolpropane | 0.56 | 0.56 | 0.56 | 0.56 | 0 |
| Trimellitic Anhydride | 0 | 0 | 0 | 0 | 0.58 |
| Acid No. (mg KOH/gram) | 5.5 | 2.2 | 5.5 | 4.4 | 5.8 |
| Solubility[2] | | | | | |
| PMA | no | yes | yes | yes | yes |
| EB | no | yes | yes | yes | yes |
| SC-150 | no | no | no | no | yes |
| Molecular weight[3] | | | | | |
| Mn | na | na | 3433 | 2523 | 2731 |
| Mw | na | na | 8147 | 5155 | 6848 |
| Mw/Mn | na | na | 2.37 | 2.04 | 2.5 |

[1]Dimethyl 2,6-naphthalenedicarboxylate
[2]Dowanol PMA is methoxypropylacetate, Dowanol EB is ethylene glycol monobutyl ether, and Solvesso SC-150 is an aromatic solvent
[3]GPC, polystyrene standard

EXAMPLE 2

Resins B, R1, and R2 from Example 1 were blended with three different phenolic resins to form clear paint solutions. These paints were applied to aluminum test panels and cured at elevated temperature. The coated panels were sterilized in deionized water and properties of the coatings were measured before and after sterilization. The results are summarized in Table 2 which shows that the best adhesion, both before and after sterilization, was obtained with Resin R2 and that the worst results were obtained with comparative Example B. This shows that the combination of 2,6-NDC and isophthalic acid is superior to the combination of terephthalic acid and isophthalic acid. Resin R1, which contains nearly equimolar amounts of isophthalic acid, terephthalic acid, and 2,6-NDC, also provides better sterilization resistance than resin B, but is not as good as R2. The results also demonstrate a large effect from the choice of phenolic crosslinker.

TABLE 2

Coating Properties from Resins R1, R2 and Comparative Example B Cross-linked with Three Phenolic Resins[1]

| Polyester Resin | Phenolic Resin | Phenol Type[2] | MEK Dbl[3] Rubs | Coating Properties Before Sterilization | | Coating Properties After Sterilization | |
|---|---|---|---|---|---|---|---|
| | | | | Wedge[4] Bend Adhesion (mm) | Cross Hatch[5] Adhesion | Wedge Bend Adhesion (mm) | Cross Hatch Adhesion |
| B | Solutia Santolink EP 560 | Phenol | 100+ | 2 | 3B | 71 | 2B |
| B | Georgia-Pacific GPRI 7565 | BPA | 100+ | 3 | 4B | 71 | 0B |
| B | Oxychem Methylon 75108 | allyl ether | 30 | 3 | 5B | 71 | 1B− |
| R1 | Solutia Santolink EP 560 | Phenol | 100+ | 2 | 4B | 60 | 3B− |
| R1 | Georgia-Pacific GPRI 7565 | BPA | 100+ | 20 | 4B | 71 | 0B |
| R1 | Oxychem Methylon 75108 | allyl ether | 20 | 35 | 5B | 71 | 3B |
| R2 | Solutia Santolink EP 560 | Phenol | 100+ | 0 | 5B | 0 | 4B |
| R2 | Georgia-Pacific GPRI 7565 | BPA | 100+ | 2 | 5B | 71 | 0B |
| R2 | Oxychem Methylon 75108 | allyl ether | 85 | 3 | 5B | 0 | 5B− |

[1]The paints consisted of 30% polyester resin and 20% phenolic in Dowanol PMA (50% solids solutions) with phosphoric acid catalyst at 0.2% on solids and were drawn down on plain polished aluminum Q-panels with a 22 mil wire wound rod. Cure time and temperature was 20 minutes at 220° C. Sterilization was done in a Model No. 25X All American electric pressure steam sterilizer. Sterilization conditions were 17–17.5 PSI and 120° C. for 90 minutes in deionized water.
[2]These three phenolic resins are based on 3 different base phenols: phenol, bis-phenol A, and a phenol allyl ether. They were used at 20% by weight as resin solids in the finished paint.
[3]ASTM D 4752-87 (The number of double rubs required to expose the substrate)
[4]ASTM D 3281-84 (A low number is best. The worst result possible is 75 mm, meaning adhesion after bending and taping is lost along the entire 75 mm width of the panel.)
[5]ASTM D 3359-87 (5B is perfect adhesion, 0B is the worst)

EXAMPLE 3

Aluminum and tin plated steel were coated with paints formulated with resin R2 and the Solutia Santolink EP-560 crosslinker, both with and without phosphoric acid as a cross-linking catalyst. The coating properties are reported in Table 3 which shows essentially identical properties on the aluminum and tin plated steel substrates. The phosphoric acid catalyst at this level has a positive effect on solvent resistance and a slightly negative effect on adhesion, both before and after sterilization.

TABLE 3

Comparisons of Coating Properties on Aluminum Q Panels to Tin Plated Steel Can Stock[1]

| | Uncatalyzed | Catalyzed[2] |
|---|---|---|
| MEK double rubs (Tin plate) | | |
| Rub through | 72 | >100 |
| Crosshatch Adhesion | | |
| Unsterilized | | |
| Al | 5B | 5B |
| Tin plate | 5B− | 4B+ |
| Sterilized | | |
| Al | 5B | 5B− |
| Tin plate | 5B− | 4B+ |

[1]Resin is R2 with Solutia Santolink EP-560 (60:40 solids ratio); Cured at 200° C. for 20 minutes
[2]Catalyst is phosphoric acid at 0.1% on solids

EXAMPLE 4

Can coatings were screened for performance by sterilization in a variety of foods or food simulants. We used three canned foods (tomato puree, cream of chicken soup, cream of mushroom soup) and one simulant (2% sodium chloride in water) to screen the sterilization resistance of 3 coating systems on tin plated steel. The formulations are shown in Table 4 and the results are shown in Table 5. We screened two polyester resins (R2, and R3) and one epoxy, all cross-linked with Solutia Santolink EP-560. Both polyester resin gave excellent crosshatch adhesion and good wedge bend adhesion after sterilization, with very little difference as a function of food or simulant used as the sterilization medium. The polyester systems gave better crosshatch adhesion than the epoxy and the epoxy gave better wedge bend adhesion than the polyesters.

TABLE 4

Paint Formulations for Sterilization in Food and Simulants

| | Paint | | |
|---|---|---|---|
| Parts by Weight | X | Y | Z |
| Polyester Resin R2 | 60 | 0 | 0 |
| Polyester Resin R3 | 0 | 60 | 0 |
| Epoxy Resin Shell Epon 1009 | 0 | 0 | 80 |
| Phenolic Resin Solutia Santolink EP-560[1] | 57 | 57 | 28.6 |
| Flow Additive Byk 310 | 0.1 | 0.1 | 0.1 |
| Solvent Dowanol PMA | 83 | 83 | 91.4 |

[1]Solutia Santolink EP-560 is 70% solids as received

TABLE 5

Sterilization Results on Three Coatings[1]

| Paint | Sterilized in Deionized Water | | Sterilized in 2% Sodium Chloride | | Sterilized in Tomato Puree, pH 4.25 | | Sterilized in Chicken Soup, pH 6.06 | | Sterilized in Mushroom Soup, pH 6.00 | |
|---|---|---|---|---|---|---|---|---|---|---|
| | Crosshatch Adhesion | Wedge bend Adhesion (mm) | Crosshatch Adhesion | Wedge bend Adhesion (mm) | Crosshatch Adhesion | Wedge bend Adhesion (mm) | Crosshatch Adhesion | Wedge bend Adhesion (mm) | Crosshatch Adhesion | Wedge bend Adhesion (mm) |
| X | 4B− | 60 | 4B | 50 | 5B− | 40 | 5B− | 38 | 4B+ | 37 |
| Y | 4B+ | 31 | 4B | 39 | 5B− | 34 | 5B− | 40 | 4B+ | 34 |
| Z | 4B | 19 | 4B | 23 | 4B | 9 | 4B− | 12 | 4B− | 12 |

[1]Substrate: Tin plated steel; Cure: 20 min @ 200° C. Sterilization: 90 min @ 120° C.

While the invention is described in connection with the specific examples, it is to be understood that these are for illustrative purposes only. Many alternatives, modifications and variations will be apparent to those skilled in the art in the light of the general description and examples above and such alternatives, modifications and variations fall within the scope and spirit of the appended claims.

That which is claimed is:

1. A coating composition for application to an interior surface of a can, comprising a phenoxy group-containing or amino group-containing resin that serves as a hardener or cross-linking agent, in an amount ranging from about 2 to about 45 weight percent of the coating composition; a polyester resin in an amount in the range of from about 6 to about 59 weight percent of the coating composition; and a nonaqueous carrier in the range of from about 35 to about 80 weight percent of the coating composition, wherein the polyester resin comprises a condensation product formed from (a) from about 2 to about 48 mole percent of isophthalic acid, (b) from about 2 to about 48 mole percent of a naphthalene dicarboxylic acid or alkyl ester thereof, (c) from about 0 to about 10 mole percent of trimellitic anhydride or trimethylolpropane, and (d) from about 30 to about 60 mole percent of neopentyl glycol.

2. The coating composition of claim 1 wherein the condensation product is formed from from about 10 to about 40 mole percent of isophthalic acid.

3. The coating composition of claim 2 wherein the condensation product is formed from from about 25 to about 38 mole percent of isophthalic acid.

4. The coating composition of claim 1 wherein the condensation product is formed from from about 4 to about 20 mole percent of a naphthalene dicarboxylic acid or ester.

5. The coating composition of claim 4 wherein the condensation product is formed from from about 8 to about 15 mole percent of a naphthalene dicarboxylic acid or ester.

6. The coating composition of claim 1 wherein the condensation product is formed from 2,6-naphthalene dicarboxylic acid or an alkyl ester thereof.

7. The coating composition of claim 1 wherein the condensation product is formed from from about 2 to about 8 mole percent of trimellitic anhydride or trimethylolpropane.

8. The coating composition of claim 7 wherein the condensation product is formed from from about 4 to about 7 mole percent of trimellitic anhydride or trimethylolpropane.

9. The coating composition of claim 1 wherein the condensation product is formed from from about 42 to about 60 mole percent of neopentyl glycol.

10. The coating composition of claim 9 wherein the condensation product is formed from from about 44 to about 56 mole percent of neopentyl glycol.

11. The coating composition of claim 1 wherein the condensation product is formed additionally from about 10 to about 40 mole percent of terephthalic acid.

12. The coating composition of claim 11 wherein the condensation product is formed from from about 20 to about 30 mole percent of terephthalic acid.

13. The coating composition of claim 1 wherein the condensation product is formed from (a) from about 30 to about 37 mole percent of isophthalic acid, (b) from about 8 to about 12 mole percent of 2,6-naphthalene dicarboxylic acid or alkyl ester thereof, (c) from about 5 to about 7 mole percent of trimellitic anhydride or trimethylolpropane, and (d) from about 45 to about 55 mole percent of neopentyl glycol.

14. The coating composition of claim 1 further comprising at least one catalyst.

15. The coating composition of claim 1 wherein the coating is coated onto a metal substrate.

16. A coated metal substrate comprising a metal sheet having the coating composition of claim 1.

17. A coated can body having the coating composition of claim 1.

* * * * *

UNITED STATES PATENT AND TRADEMARK OFFICE
CERTIFICATE OF CORRECTION

PATENT NO.   : 6,472,480 B1
DATED        : October 29, 2002
INVENTOR(S)  : Ronald Leslie Anderson It is certified that error appears in the above-identified patent and that said Letters Patent is hereby corrected as shown below:

Column 1,
Lines 31 and 32, "cans and ends, have met all" should read -- cans and ends have met all --
Line 39, "where the rivet, scaring and" should read -- where the rivet, scoring and --

Column 2,
Line 31, "glycols, and, in which, further," should read -- glycols, and in which further --
Line 34, "component." should read -- component, --
Line 43, "wherein, R and R are" should read -- wherein R and R are --

Column 4,
Line 13, "example ethylene glycol" should read -- example, ethylene glycol --
Line 49, "20% too about 50%," should read -- 20% to about 50%, --
Line 57, "easily and that can be" should read -- easily, that can be --

Column 8,
Line 39, "resins (R2, and R3) and" should read -- resins (R2 and R3) and --
Line 41, "resin gave excellent crosshatch" should read -- resins gave excellent crosshatch --

Signed and Sealed this

Twenty-fifth Day of March, 2003

JAMES E. ROGAN
*Director of the United States Patent and Trademark Office*